United States Patent [19]

George et al.

[11] Patent Number: 4,841,550
[45] Date of Patent: Jun. 20, 1989

[54] UNIVERSAL NULL DTE

[75] Inventors: Michael George; Lyndon G. Pierson; Mark E. Wilkins, all of Albuquerque, N. Mex.

[73] Assignee: The United States of America as represented by the United States Department of Energy, Washington, D.C.

[21] Appl. No.: 118,075

[22] Filed: Nov. 9, 1987

[51] Int. Cl.[4] .............................................. H04L 7/00
[52] U.S. Cl. ..................... 375/118; 375/121; 370/102; 370/118
[58] Field of Search ................ 375/36, 106, 112, 118, 375/121; 370/58, 61, 102, 108, 112, 84

[56] References Cited

U.S. PATENT DOCUMENTS

| | | | |
|---|---|---|---|
| 3,825,899 | 7/1974 | Haeberle et al. | 370/102 |
| 4,009,343 | 2/1977 | Markey et al. | 370/104 |
| 4,071,887 | 1/1978 | Daly et al. | 370/102 |
| 4,154,985 | 5/1979 | Munter | 370/84 |
| 4,375,103 | 2/1983 | Arneth et al. | 375/121 |
| 4,472,803 | 9/1984 | Iijima | 370/110 |
| 4,484,327 | 11/1984 | Hanson | 370/84 |
| 4,596,026 | 6/1986 | Cease et al. | 370/102 |
| 4,661,966 | 4/1987 | Schreiner | 375/118 |
| 4,736,394 | 4/1988 | Giovanelli et al. | 375/36 |

OTHER PUBLICATIONS

G. Epenoy, J. P. Lips, & P. Thirion, "Elastic Buffer with Automatic Shift Correction Capability" *IBM Technical Disclosure Bulletin*, vol. 22, No. 10, Mar. 1980, pp. 4597–4599.

J. Alvarez, J. Brennen, R. Krug, & J. Shabe, "Elastic Buffering Techinque for a Satellite Communications Controller", *IBM Technical Disclosure Bulletin*, vol. 23, No. 7A, 12/80, pp. 2888–2890.

P. T. Neale, "Elastic Buffers for Digital Rings", *National Physical Laboratory*, NPL Report DITC 38/84, Jan. 1984, pp. 1–13.

*Primary Examiner*—Robert L. Griffin
*Assistant Examiner*—Stephen Chin
*Attorney, Agent, or Firm*—George H. Libman; James H. Chafin; William R. Moser

[57] ABSTRACT

A communication device in the form of data terminal equipment permits two data communication equipments, each having its own master clock and operating at substantially the same nominal clock rate, to communicate with each other in a multi-segment circuit configuration of a general communication network even when phase or frequency errors exist between the two clocks. Data transmitted between communication equipments of two segments of the communication network is buffered. A variable buffer fill circuit is provided to fill the buffer to a selectable extent prior to initiation of data output clocking. Selection switches are provided to select the degree of buffer preload. A dynamic buffer fill circuit may be incorporated for automatically selecting the buffer fill level as a function of the difference in clock frequencies of the two equipments. Controllable alarm circuitry is provided for selectively generating an underflow or an overflow alarm to one or both of the communicating equipments.

17 Claims, 4 Drawing Sheets

UNIVERSAL NULL DTE

The U.S. Government has rights in this invention pursuant to Contract No. DE-AC04-76DP00789 between the U.S. Department of Energy and AT&T Technologies, Inc.

BACKGROUND ART

This invention relates to improvements in multi-segment communication networks, and more specifically to data terminal equipment including elastic buffers for absorbing phase error and phase drift (mismatched frequencies) between two segments of a communication network controlled by separate, mismatched, clocks operating at nominally identical frequencies. Still more particularly, the invention relates to such data terminal equipment including variable preload means for loading the buffer therein to selectable preload levels in order to minimize occurrences of underflow and overflow alarms and to such devices wherein an alarm circuit is available to a user for generating an alarm to one or the other of the two segments of the communication network.

Null data terminal equipment (DTE) is known for use in interfacing between two segments of a multi-segmented communication network. Such DTE's are typically connected between two data communications equipment (DCE) as illustrated at 10, 12 and 14 in FIG. 1. As shown therein, each DCE provides a "receive timing" (RT) signal to the DTE to control reception of data thereby. Similarly, each DCE provides a "send timing" (ST) signal to the DTE to request that the DTE send data to the DCE.

Figure 1:
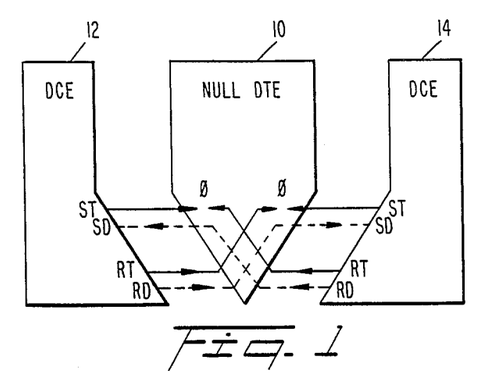
FIG. 1 shows an interconnection between data communication equipment devices at remote ends of two segments of a communication network and a null data terminal equipment.

Thus, the DTE responds to an RT signal from one DCE to accept "received data" (RD) therefrom. Similarly, the DTE responds to the ST signal provided by the second DCE to transmit "send data" (SD) thereto. The DCE's are typically remotely located modems which transmit the ST and RT signals to DTE 10 over the segments of the communication network, which may be long line communication links of the telephone company, a satellite link, or other communications links. Where the DCE, or modems, of two segments of the network each have separate master clocks, timing errors frequently occur as a result of phase error and phase drift causing frequency mismatch.

Thus, in a communication link for two communication segments from two remotely connected modems, each having its own internal clock, the received data (RD) will be present at the output of the modem at DCE 12 in synchronism with the RT clock thereof. If the ST clock of DCE 14 is of the same frequency as (and is in phase with) RT of DCE 12, then RT from DCE 12 will be successfully clocked into the SD path of DCE 14. However, since the modems have their own individual internal clocks, typically the modems do not operate at exactly the same frequency with exactly the same stability.

Illustratively, if the clock rate for DCE 12 is 56,000 Hz, while that for DCE 14 is 56,001.5 Hz, with respective stabilities of ±1.5 Hz and ±0.5 Hz respectively, it is seen that DCE 14 has a faster ST clock than the RT clock of DCE 12. Under such circumstances, DCE 14 may be capable of clocking RD from DCE 12 into the SD path of DCE 14. However, within less than one second, the modem at DCE 14 would attempt to sample data from the modem at DCE 12 while the data is in transition. Such attempted transitional sampling results in data errors.

Further, since the ST clock of the modem of DCE 14 is 1.5 Hz faster than that of the modem of DCE 12, one or two additional cycles of the DCE 14 clock will occur per second. In view of the assumed stability of the two clocks, however, even if the clocks drift, the ST clock of DCE 14 will still be faster than the RT clock of DCE 12. Thus, it is likely that DCE 14 will always be faster than DCE 12. Nonetheless, at times, the RT and ST clocks may "walk" backwards and forwards with respect each other. Under such circumstances data errors are even more frequent than above noted.

Accordingly, it is known in the prior art to utilize data buffering by a FIFO (first in first out register), in order to hold off clocking errors for a predetermined amount of time.

A passive DTE, however, is incapable for compensating for such frequency mismatch. Data buffering is accordingly needed.

A known device capable of performing the required buffering is the model 2401H Dual Elastic Buffer marketed by Telecommunications Techniques Corp. However, such a device requires internal rewiring to meet specifications of both the DTE and DCE. Moreover, the buffer included therein is only 64 bits long and is thus too short to avoid frequent underflow and overflow alarm conditions. Still further, controls for the overflow and underflow alarms are not easily accessible. Additionally, preloading of the buffer is not selectable.

For illustrative purposes, for send timing operating at 56,000 bits per second and for received timing controlled by a clock operated at 56,002 bits per second, a phase drift of 2 bits per second results. Without selectable preload, the buffer is loaded to 32 bits prior to operation. Accordingly, only 32 bits are available for phase drift. Thus, overflow occurs each 16 seconds for the above described example.

When operating with communication devices which resynchronize on under- and over-flow conditions, a maximum number of such resynchronizations may be effected for a given period of time (10 hours). For the above described example, 2,250 overflows would occur. However, the communication device may only be capable of resynchronizing 500 times during this period.

Such prior art devices are thus incapable of providing efficient and continuous data transmission.

Other known prior art devices are described in a number of patents.

Iijima, U.S. Pat. No. 4,472,803, provides a data transmission system wherein buffers are activated by a counter set to a predetermined reference value. However, such an arrangement does not apply to the types of circuits contemplated by the present invention. The '803 apparatus is used on a point-to-point (i.e. single segment) circuit for transmission of specific information which may be produced at different speeds. Thus, the apparatus does not compensate for two different clock frequencies of two separate segments of a communication network.

Haberle et al., U.S. Pat. No. 3,825,899, describes a satellite transponder communication system incorporating elastic buffering techniques to confine data to a synchronized transmission line. This apparatus, however, is specifically designed as a pre- and post-processor for interfacing data to a time domain multiple access (TDMA) device on satellite systems. Data is altered by the '899 device by addition or deletion of a selected number of bits in order to assure that data will be properly clocked out of a memory and have a valid and acceptable format, which may have a different transmission speed from that initially provided thereto. The device is accordingly unrelated to communication between two segments of a multi-segment communication network wherein constant clock phase drift or phase error may exist at the modem interfaces between the two segments.

Hanson, U.S. Pat. No. 4,484,327, identifies an interface between two data communications systems operating at different rates. A buffer is used for this purpose. This reference is intended to interface two devices operating at completely different data rates, however, such as 9,600 bps and 19,200 bps. Hanson (similarly to Haberle) inserts and deletes bits at both ends of the circuit.

Munter, U.S. Pat. No. 4,154,985, discloses an interface circuit for digital telephone facilities operating at different rates. Elastic storage circuits are utilized for coupling data signals from the two facilities. However, similarly to the '327 apparatus, the '985 device is utilized to convert data transmission rates. The disclosure does not teach how to provide ongoing communication between two segments of a system having substantially identical data transmission rates but which may be differentiated by a small error in frequency.

Markey, U.S. Pat. No. 4,009,343, discloses interface circuitry for a data communication system. Therein, synchronization is provided by a master clock data stream transmission from a local station. However, similarly to the above described '985 disclosure, the apparatus disclosed in the '343 patent is specifically designed as an interface for data channels on satellite systems and not for general communication networks. Such an arrangement is unrelated to buffering data between links in a multisegment configuration.

Still other prior art disclosures consider concepts related to the issues herein addressed. Thus, in IBM Technical Disclosure Bulletin Vol. 22, No. 10, March, 1980, there is disclosed at pages 4597-4599 an elastic buffer having an automatic shift correction capability. More particularly, a number of latches, 15, 16 and 17, control transfer of data from latches 12, 13 and 14. Load timing pulses are provided at the same frequency as Input timing pulses from the transferring system while data is transferred to the receiving system under the control of Read Request pulses generated by the receiving system. However, Read and Reset timing pulses are required at twice the rate of the Input timing pulses. Moreover, reading out of the buffer typically starts at its middle. Nonetheless, when two consecutive data loads occur positive shift information is memorized indicating that input timing is faster than output timing, and when two consecutive data reads occur negative shift information is memorized, indicating that output timing is faster than input timing. At the conclusion of a message the remaining stored data are read out, "one" data bits enter the buffer, and the control latches are preset according to the shift information to set the device in an "almost full" or "almost empty" state for the next message.

Moreover, in IBM Technical Disclosure Bulletin Vol. 23, No. 7A, December 1980, there s disclosed at pages 2888-2890 an elastic buffering technique for a satellite communication controller. The arrangement is intended to compensate for variations in the diurnal slant range between an earth station and the satellite by providing only enough buffering to accommodate the effects of the greatest expected deviation in slant range plus an additive factor to enable local synchronization with the transmit clocks. In operation, however, a receive frame timing at the receiving station is delayed, by providing the elastic buffer storage, until a delay period of delta magnitude after the earliest receive frame time has expired. The disclosure contemplates situations wherein the transmit clock and the receive clock at a given station have non-coincident frame intervals, i.e., are not in phase, but does not address a situation wherein the clock frequencies are different.

National Physical Laboratory Report DITC 38/84 of January, 1984, contemplates the use of elastic buffers for digital rings. Questions of synchronization are addressed therein. However, such synchronization appears to be related to component timing changes, rather than to compensation for different clock frequencies used to enter and withdraw data from a terminal equipment. In other words, the report appears to consider a self adapting buffer for systems controlled by a single clock, and not the multi-segment, multi-clocked systems contemplated herein.

DISCLOSURE OF INVENTION

It is accordingly an object of the present invention to overcome the difficulties of the prior art.

It is a more specific object of the invention to provide an apparatus for interfacing between two links in a multisegment general communication network, where the two segments are either at the same frequency and out of phase or have master clocks which are only slightly different in frequency.

Yet a more specific object of the invention is to buffer data between two segments of a multi-segment general communication network while preventing loss of data until the buffer used therein has become filled.

Still another object of the invention is the provision of a buffer in a universal DTE for permitting two segments of a multi-segment general communication network to communicate with each other while operating at different phase or frequency, without adding to or subtracting from the data.

It is a further object of the invention to provide a buffer for interfacing between separately clocked segments of a multi-segment communication network wherein the buffer includes a variable preload control.

Yet another object of the invention is the provision of a variable preload control for a buffer between differently clocked segments of a general communication network wherein the preload control is dynamically operable in response to differences in clock frequencies of the two segments.

It is an additional object of the invention to provide a DTE having a variable preload buffer for interfacing between two segments of a multi-segment general communication network, wherein switching circuits are provided to enable a user to generate or block individual under- or over-flow alarms to or from one or another of the interfacing segments.

In accordance with one aspect of the invention, there is thus provided an improvement for a multi-segment communication network having at least two segments, each segment having a clock source for generating a data communication rate and data communication equipment (DCE) for communicating with another segment. The improvement comprises data terminal equipment for interfacing between two segments of the communication network. The terminal equipment includes a first input section for receiving receive clock signals from a first DCE in a first segment of the network, a buffer for receiving data from the first DCE, and a second input section for receiving send clock signals from a second DCE in a second segment of the network. Additionally, there is included a transmitter for transmitting data from the buffer to the second DCE in response to the send clock signals generated by the second DCE.

A preloader is provided for loading the buffer to a predetermined selectable level prior to activating the transmitter to transmit the data to the second DCE. The preloader includes a gate for permitting the send clock signals from the second DCE to activate the buffer to provide stored data to the transmitter and an enabling circuit operable for enabling the gate to pass the send clock signals from the second DCE to the buffer only after the buffer has been filled to a selected level.

Preferably, the preloader includes a counter for counting a number of bits of received data, and the enabling circuit is operable in response to a predetermined count output of the counter for enabling the gate. Thus, the enabling circuit permits the send clock signals to empty the buffer only after the predetermined count has been reached and a predetermined number of bits have been clocked in to the buffer.

The preloader may further include a switching circuit responsive to a count established by the counter for activating the enabling circuit. Moreover, the enabling circuit may include a flip flop clocked by the switching circuit for providing an output signal to enable the gate, and the output signal from the flip flop may be further connected to the counter to enable the receive clock signals to clock the counter.

In one embodiment of the invention, the switching circuit includes manually operable switches for manually selecting a preload level for the buffer.

In an alternative embodiment, the switching circuit includes a dynamic fill circuit responsive to frequency differences between the receive clock signals and the send clock signals for automatically selecting a preload level for the buffer in accordance with a determination of which of the receive and send clock signals has a higher frequency. The dynamic fill circuit may include means responsive to a frequency difference between the receive and send clock signals to set the preload level for the buffer.

Further, the dynamic fill circuit may also include an up-down counter for establishing a sign and magnitude of a frequency difference between the clock signals and for establishing the preload level based on the sign and magnitude of the frequency difference between the clock signals.

In accordance with another aspect of the invention, the inventive data terminal equipment further includes a master reset generator for generating a master reset signal on power up, manual reset, and alarm reset conditions. In this arrangement, the enabling circuit includes flip flop clocked by the switching circuit for providing an output signal to enable the gate. Moreover, the output signal from the flip flop is also connected to the counter to enable the receive clock signals to clock the counter. The output signal from the flip flop is further connected to the master reset generator for enabling generation of a master reset in response to an alarm condition.

In accordance with yet another aspect of the invention, the improved circuit includes an alarm for generating an alarm signal in response to detection of an underflow or overflow condition of the buffer.

Moreover, the invention advantageously may include a second switching circuit for switchably controlling the alarm to generate the alarm signal for one or both of an underflow and an overflow condition. The second switching circuit is also operable for selecting either one or both of the first and second DCE's to receive the alarm signal.

Other objects, features and advantages of the present invention will become readily apparent to those skilled in the art from the following description wherein there is shown and described a preferred embodiment of the invention, simply by way of illustration and not of limitation of the best mode (and alternative embodiments) for carrying out the invention. The invention itself is set forth in the claims appended hereto. As will be realized upon examination of the specification with due reference to the drawings, the present invention is capable of still other, different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of the present invention and, together with the description, serve to explain the principles of the invention. In the drawings.

BEST MODE FOR CARRYING OUT THE INVENTION

As previously noted with reference to FIG. 1, a DTE of the present invention is connected in an arrangement wherein data communication equipments of two separate segments of a communication network provide timing signals for data transfer and further provide and receive data therefrom.

Figure 2:
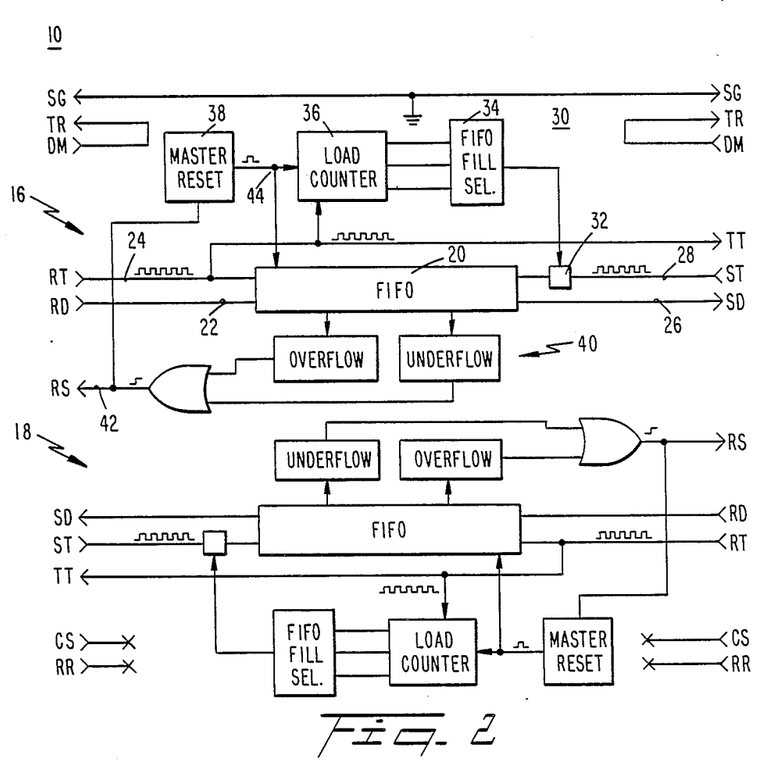
FIG. 2 is block diagram representing an arrangement according to the present invention.

Referring now to FIG. 2, the inventive DTE is generally shown at 10. The various data lines and clock lines used to control data transfer are illustrated thereon in accordance with standard RS449 notation. More particularly, as previously described with respect to the prior art, each DCE in communication with the inventive DTE provides RT and ST signals thereto. Moreover, each DCE in communication with the DTE sends data to be received by the DTE on a line RD, and further receives data sent by the DTE on a line SD.

Thus, as previously described with reference to FIG. 1, it is the function of the DTE to receive data from the RD path of one DCE and to transmit it to the SD path of the other DCE. Reception of the data by the DTE is under control of RT signals sent by the transmitting DCE. Transmission of the data by the DTE is under the control of ST signals provided by the receiving DCE. Towards that end, the universal null DTE of the present invention may be considered as having two separated portions. A first portion, shown generally at 16, is operable for transfer of data from left to right in the figure. A second portion, shown generally at 18, is operable for controlling transfer of data from right to left in the figure. It will be recognized upon examination of the figure that the two portions are substantially identical. Accordingly, the following description is provided with reference to the first portion 16. A similar description is applicable to the second portion 18 of DTE 10.

As is generally illustrated at FIG. 2, each of the two portions of the DTE includes a FIFO 20 receiving input data on RD line 22 under the control of clock signals provided on RT line 24. Data is output from FIFO 20 on SD line 26 under the control of clock signals provided on ST line 28.

A significant aspect of the present invention relates to the use of a variable fill level preloading circuit 30. preloading circuit 30 operates by controlling a gating circuit 32 to enable or block passage of ST signals on line 28 for reading data from FIFO 20.

Thus, by delaying enabling of gating circuit 32, the preloading circuit 30 permits FIFO 20 to be filled to a selectable, predetermined, level prior to initiating data transmission to the receiving DCE. The preloading circuit 30 includes a buffer fill level selecting circuit 34 as will be described hereinbelow. There is further provided in the preloading circuit 30 a counter 36 for determining the data fill level of FIFO 20.

Selecting circuit 34 may include a user operable loading circuit, responsive to a predetermined output count of counter 36, for enabling gating circuit 32.

Thus, a user may selectively determine the preload fill level for FIFO 20 prior to initiation of data transmission therefrom to the receiving DCE.

Alternatively, the selecting circuit 34 may be a dynamic selecting circuit, including circuitry for detecting sign and magnitude of frequency differences between the transmitting and receiving DCE's. Responsive to the detected frequency differences, the dynamic selecting circuit is made responsive to different output counts of counter 36 in order to enable the gating circuit 32.

A master reset circuit 38 is included for resetting the various circuits to permit proper operation upon occurrence of a power on condition, an alarm condition, a manual reset, and the like. An alarm circuit 40 is provided in the DTE of the present invention, including circuitry for detecting overflow and underflow conditions of FIFO 20 and for generating an alarm in response thereto.

The first portion of the system illustrated at FIG. 2, thus operates to clock data in on the left hand side in response to the RT clock signal generated by the remote modem. Data remains in the buffer until the ST clock signal from the remote modem on the right hand side clocks out the data. So long as an overflow or an underflow condition does not occur for FIFO 20, data will continue to be clocked out without error. Upon occurrence of a reset condition, whether due to an error, power on condition, or manual reset condition, the ST signals being inputted on line 28 are blocked from controlling FIFO 20. Thus, premature overflow or underflow of FIFO 20 is prevented. In operation, the RT signals used to clock data into FIFO 20 are also used to increment counter 36. When the count of counter 36 attains a predetermined value, selecting circuit 34 enables gating circuit 32 to permit the ST signals, to begin clocking out data from the FIFO.

Data transmission from FIFO 20 continues until either an overflow or underflow alarm condition occurs. Upon occurrence of such an alarm, an alarm signal RS is toggled on an alarm line 42. The alarm signal activates master reset circuit 38 to generate a reset signal on a reset line 44. The reset line is used to clear FIFO 20 as well as counter 36, thus initiating the process again.

Accordingly, a data clocking error, representing an overflow or underflow of FIFO 20 due to frequency differences between the RT signals and ST signals, is held off for a time equal to the frequency differences between the RT and ST signals (in hertz) multiplied by half the length (in bits) of the FIFO 20.

In accordance with the present invention, however, the hold-off time is increased by altering the number of bits used to prefill the buffer based on differences in frequency between the RT and ST clock signals.

Figures 3, 3A:
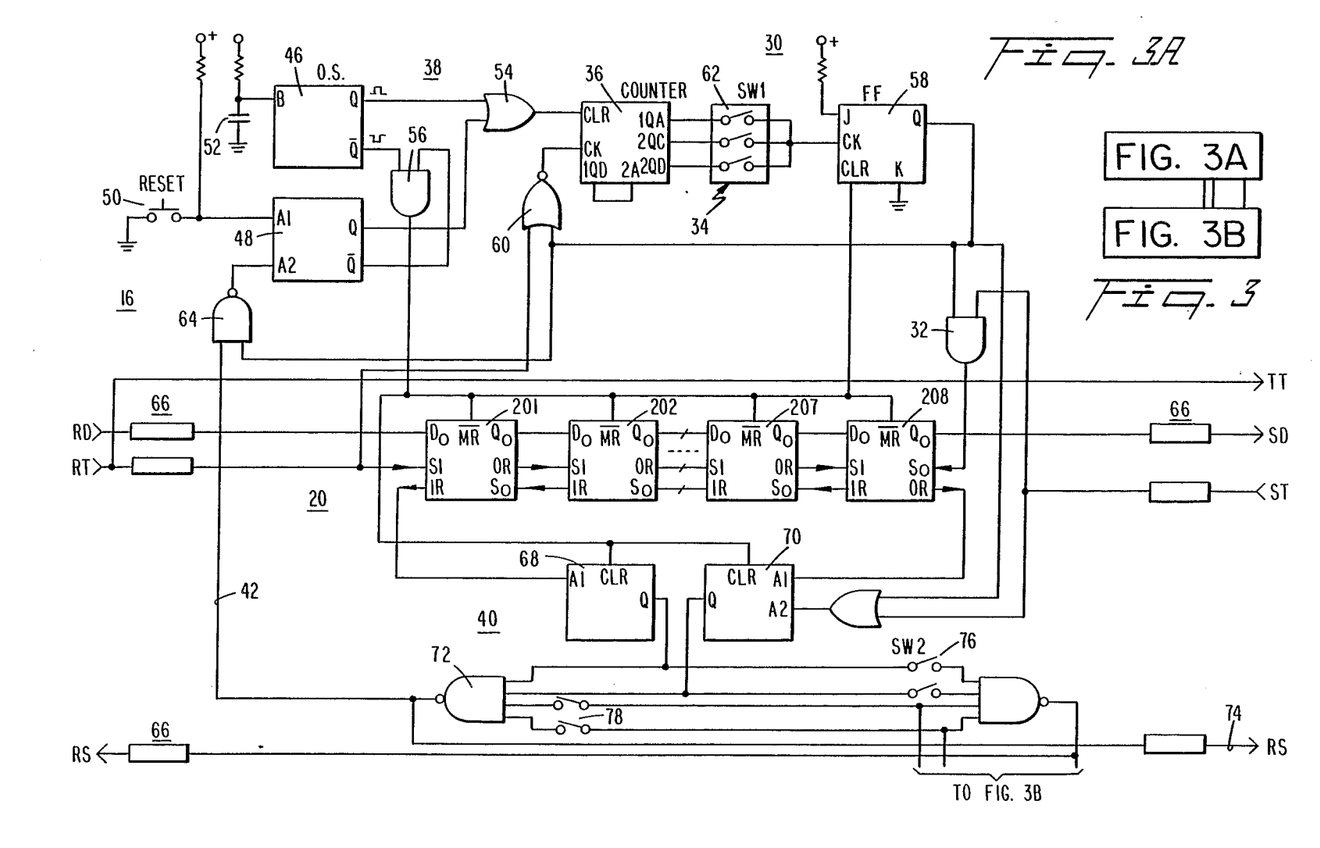
FIG. 3 illustrates the detailed arrangement of the structure of FIG. 2.
Figure 3B:
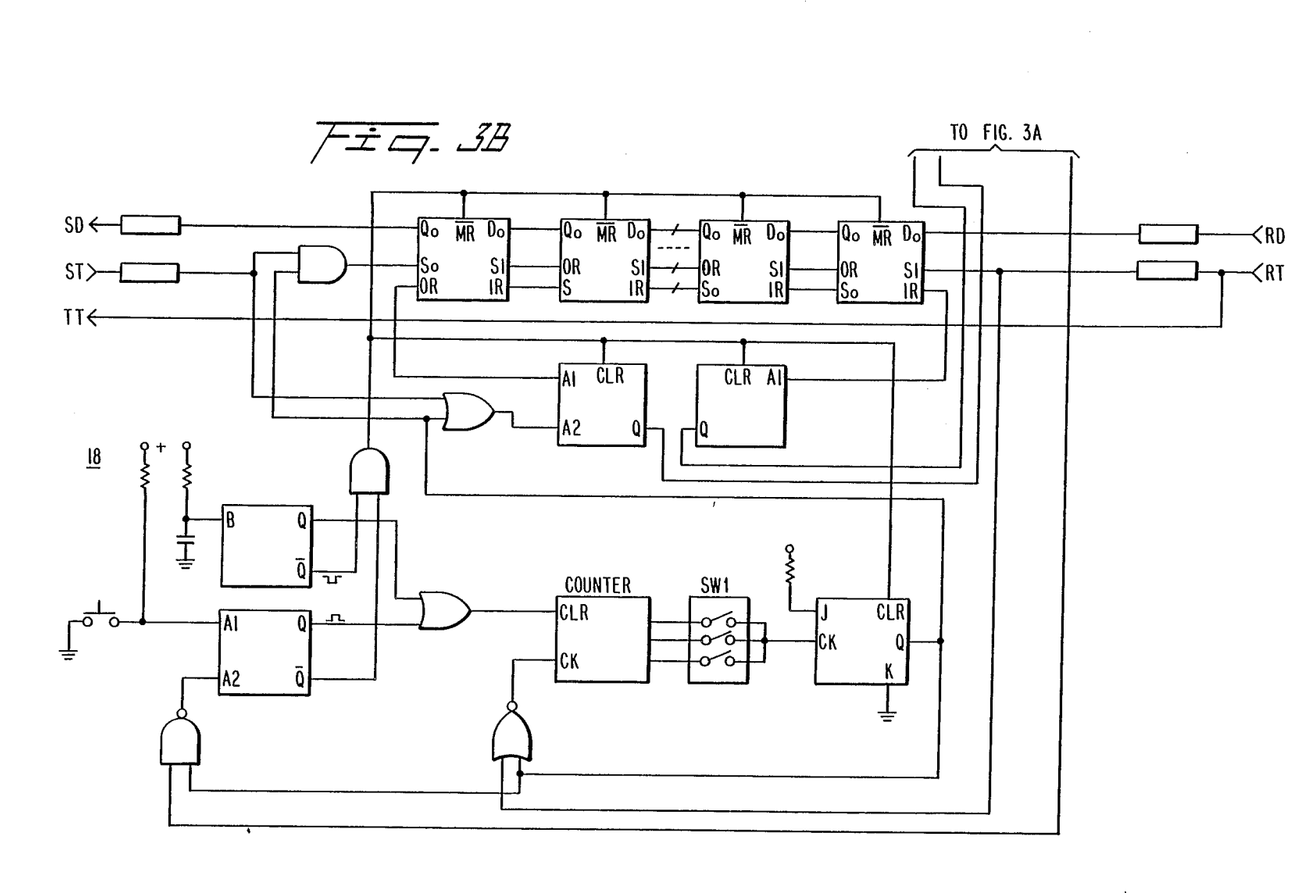

Referring now to the detailed schematic of the invention, shown at FIG. 3, components corresponding to those shown illustrated in the block diagram in FIG. 2 are labeled by the same reference numerals. Again, for ease of description, reference is only made to the first portion 16 of the diagram, inasmuch as the second portion 18 is substantially identical thereto.

As illustrated in the diagram, the FIFO buffer 20 is comprised of eight 64 bit buffers 201, 202, . . . 207, 208. The buffers are provided with master reset inputs MR, data input and output terminals $D_0$ and $Q_0$, and control signal inputs SI and SO and outputs IR and OR. The master reset circuit 38 is comprised of a pair of one-shots 46 and 48, responsive to a manual momentary (normally open) reset switch 50, to the alarm signal 42, and to a power-up condition. The master reset circuit outputs resync pulses in response to any of the above described (or other) conditions. Gating circuitry is provided to inhibit generation of a second resync pulse during a buffer fill operation, as well as to inhibit operation of counter 36 during normal data transfer operations.

In operation, upon application of power to the circuit, a capacitor 52 charges to trigger the input of one-shot 46. Responsively thereto, one-shot 46 sends out a pulse to clear all other integrated circuits and to reset counter 36. Particularly, in FIG. 2 there is indicated a single reset line 44 carrying a positive pulse. However, in the detailed arrangement of FIG. 3, the positive output transition of one-shot 46 is passed through OR gate 54 to clear counter 36. At the same time, the negative transition output by one-shot 46 is passed by AND gate 56 to provide a negative master reset signal for buffers 201–208. The signal is also provided to clear a flip-flop 58, forming part of the fill level selecting circuit 34. With the Q output of flip-flop 58 reset by the power-up signal, a NOR gate 60 is enabled to provide the RT signal to the clock input of counter 36. For the reset (or low) output level of flip-flop 58, AND gate 32 is disabled and the ST clock signal is not input to the SO input of the FIFO. Accordingly, flip-flop 58 determines by a low output level that the inventive DTE is in a buffer fill mode.

When flip-flop 58 is toggled, however, a high output level disables counter 36 from counting by providing a constant low output from NOR gate 60. However, the high output level from flip-flop 58 enables AND gate 32 to pass the ST clock onto the FIFO 20 and thus to provide normal data extraction therefrom Accordingly, flip-flop 58 is seen to provide an output signal which determines the operating state of the inventive DTE as being either a preload state (low output value) or a normal operating state (high output value). Other circuits may be used to provide various types of state indicating signals, as known in the art.

Flip-flop 58 is toggled in response to an output signal from a switching circuit 62, responsive to the output count signals provided by counter 36. More particularly, any one (or more) of the count signals of counter 36 may be passed by the switching circuit 62 to clock (i.e. toggle) flip-flop 58. Thus, upon attaining of a predetermined count in a preload operating cycle, the predetermined count being selected by the switch closures of switching circuit 62, flip-flop 58 changes state to terminate the preload operating cycle and to enter the normal data transmission cycle of the structure.

Switching circuit 62 may be fixed to select a particular preload fill level, such as one quarter, one half or three quarters full, prior to beginning output data clocking by the ST clock signal. For sufficiently stable ST and RT clock signals, the buffer of the present invention may thus be set to prefill only to one quarter of its capacity (if the frequency of the RT signal is higher than that of the ST signal) or to three quarters of its capacity (if the frequency of the ST signal is higher than that of the RT signal).

Thus, referring to the previous illustration wherein a frequency difference of 2 bps (bits per second) is assumed between the ST and RT clock signals, and specifically where the frequency of the RT clock is 2 bps greater than that of the ST clock, for a 512 bit FIFO (as provided herein) setting the switching circuit to respond to a one quarter count (i.e. 128 bits out of 512 bit capacity) leaves 384 bits available prior to overflow. At a rate of 2 bps, 192 seconds will pass prior to an overflow condition. Thus, in a 10 hour interval, the buffer of the inventive DTE will overflow only 188 times, in comparison to 2250 for the known 64 bit buffer which always starts at a 32 bit load.

Alternatively, if the two clock signals do not have a stable frequency difference, it would be advisable to set the switching circuit 62 to toggle flip-flop 58 upon a half full condition of FIFO 20.

When the flip-flop 58 provides a high level output (in the normal operating cycle) the NAND gate 64 enables one-shot 48 to generate resets in conjunction with one-shot 46. Also shown in the schematic diagram of FIG. 3 are a plurality of RS232-to-TTL converters and TTL-to-RS232 converters labelled 66.

The alarm circuit 40 of the inventive DTE is shown in greater detail in the schematic of FIG. 3 as including retriggerable one-shots 68 and 70. The IR output clock signal of buffer 201 is connected to retrigger one-shot 68. The constant retriggering of one-shot 68 results in a high level output therefrom. The IR signal, which is essentially the same signal as provided at input SI to buffer 201, thus represents the RT input clock.

Upon an overflow condition of the buffer, IR stops retriggering one-shot 68, thus providing a negative going output alarm signal from a NOR gate 72. Similarly, buffer 208 provides an output signal OR, following input SO thereto and thus corresponding to the input clock signal ST, for repeatedly retriggering one-shot 70. Thus, the output of one-shot 70, similarly to that of one-shot 68, remains at a constantly high level during normal operation of the buffer cascade. If an underflow condition occurs, wherein all buffers are empty, the OR output of buffer 208 becomes low and remains low. Thus, one-shot 70 is no longer retriggered, its output drops to low level, thus causing the output of NAND gate 70 to rise, indicating an alarm and, via NAND gate 64, initiating a master reset. Moreover, as shown in the schematic of FIG. 3, the alarm signal output by NAND gate 72 toggles a Request to Send "RS" signal on RS line 74, to the DCE which caused the underflow by the excessively high ST clock rate. The RS signal may be used by the DCE for resynchronization purposes. Upon completion of the master reset, the alarm output on line 42 goes low and the RS output line is again toggled.

An additional one-shot circuit (not shown) may be used to lengthen the duration of the RS pulse created by the alarm signal.

A further advantage of the present invention is illustrated by a second (alarm) switching circuit including switches 76 and 78. The alarm switching circuit is shown as including four switches. The switches 76 are shown as providing both overflow and underflow conditions, from the first portion 16 of the DTE to the NAND gate utilized to generate an alarm signal for the second portion 18 of the DTE. Thus, by closure of the appropriate ones of switches 76 and 78, both data paths (SD and RD from both DCE's) may be resynchronized upon occurrence of an alarm in an overflow or an underflow condition occurring for either direction of data transfer. Both DCE's may thus be affected by occurrence of an overflow or underflow of either data path.

Accordingly, the alarm switching circuit comprised of switches 76 and 78 is operable for selecting one or both DCE's to receive an alarm generated by either data path.

Operation of the system illustrated in FIG. 3 may generally be described as follows. When the Q output of flip-flop 58 is reset by a power-up, alarm or manual reset condition, the incoming RT clock signal is gated through NOR gate 60 to the clock input of counter 36. As the counter counts up, the various outputs thereof reflect, in binary format, the number of bits allowed to be clocked into the FIFO buffers. Simultaneously with the counting, data bits are clocked into the cascaded buffers 201–208, using the RT signal as the input FIFO clock (at pin SI of buffer 201). Moreover, during the count up process, the ST signal is inhibited by AND gate 32 from clocking data out of the buffer 208, thus allowing the cascaded buffers to fill up to the prescribed count.

When the predetermined bit count is attained, as reflected by the settings of switching circuit 62, the next RT clock cycle into counter 36 toggles the appropriate counter output, thus clocking flip-flop 58 and setting the Q output thereof to a high level, inhibiting further counting by counter 36 and gating the ST signal to the SO input of buffer 208. On the next transition of the ST signal, clocking through of data by all of the buffers begins. Thereafter, data is clocked in by the RT signal and clocked out by the ST signal until a buffer over- or under-flow condition occurs.

At any time during operation, momentary closure of the reset switch 50 initiates a manual reset operation. Oneshot 48 generates a short duration pulse on the outputs Q and Q' thereof. The Q outputs of one-shots 46 and 48 are ORed together, while the Q' outputs of the two one-shots are ANDed together. Thus, either a power-up or a manual reset operation performs the same operation, of resetting IC's (integrated circuit chips) and starting the buffer preload filling sequence. The additional trigger connection to pin A2 of one-shot 48 similarly causes a master reset under alarm conditions as described above. NAND gate 72 (and the corresponding symmetrically disposed NAND gate for portion 18 of the DTE) are provided as a quad NAND gate, for setting the alarm and triggering one-shot 48 to reset the circuit. NAND gate 64 inhibits reset on alarm when the output of flip-flop 58 is low (during the preload cycle of operation).

Upon occurrence of a master reset, the master reset signal flushes the buffers and permits the buffer to refill to the selected level by switching circuit 62.

In the illustrated arrangement, the RT signal is passed from one DCE to the second DCE as a Terminal Timing (TT) signal to enable the universal null DTE of the invention to function as a standard (non-buffering) null DTE. Such an arrangement may be used when both of the DCE's are externally clocked.

Figure 4:
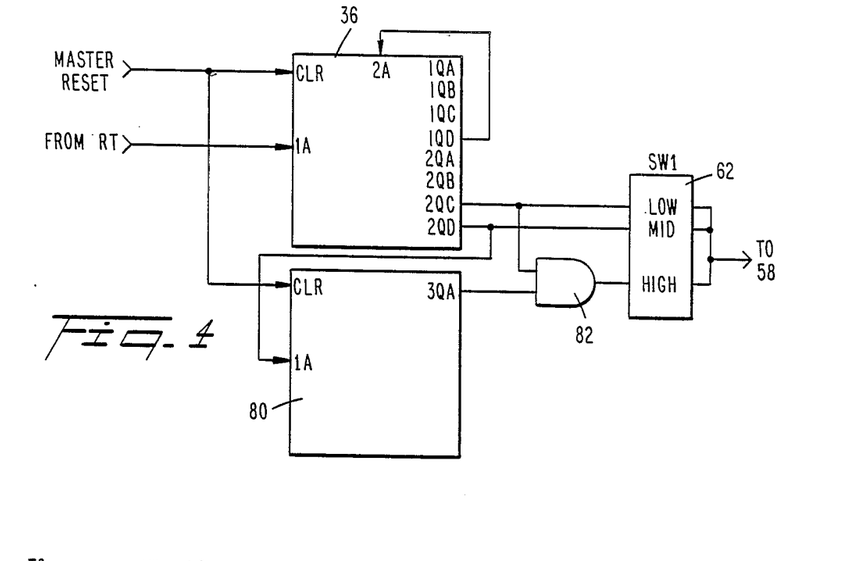
FIG. 4 illustrates one embodiment of a buffer fill selection circuit in the structure of FIG. 2.

Referring now to FIG. 4, there is shown an additional detail of the variable fill level preloading circuit 30. Specifically, there is shown a detailed arrangement for counter 36, as well as a separate counter 80 and an AND gate 82, for controlling operation of the switching circuit 62. As previously noted, switching circuit 62 includes a number of selectable setable switches. The switches may be labeled low, medium and high as illustrated in the figure.

Switching circuit 62 allows one of the three binary output combinations from counter 36 to toggle flip-flop 58. For a count of 128 (i.e. FIFO 20 is one quarter full), the output 2QC of counter 36 drops to a low level, thus toggling flip-flop 58. Similarly, for a count of 256 (FIFO 20 is half full), counter output 2QD drops to a low level and at a count of 384 (three quarter full) the output of AND gate 82, combining the output 2QC and an output 3QA of counter 80, goes low.

Other combination of the outputs of counter 36 may be used to preset the buffer fill count to other values. For example, output 1QB may be used to allow only four bits to be loaded into the buffers prior to initiation of clocking out of data. The combination of outputs 1QD, 2QA, 2QB, 2QC, 2QD and 3QA, when ANDed together with 1QB, permits the buffer to be filled to 512−4=508 bits prior to clocking data out. The above described combinations are useful when the two clock frequencies are known to be different from one another and sufficiently stable to assure that one is always faster than the other. For such an arrangement, maximum utilization is had of the 512 bit buffer cascade to hold off over- and under-flows for 508 bit cycles.

Figure 5:
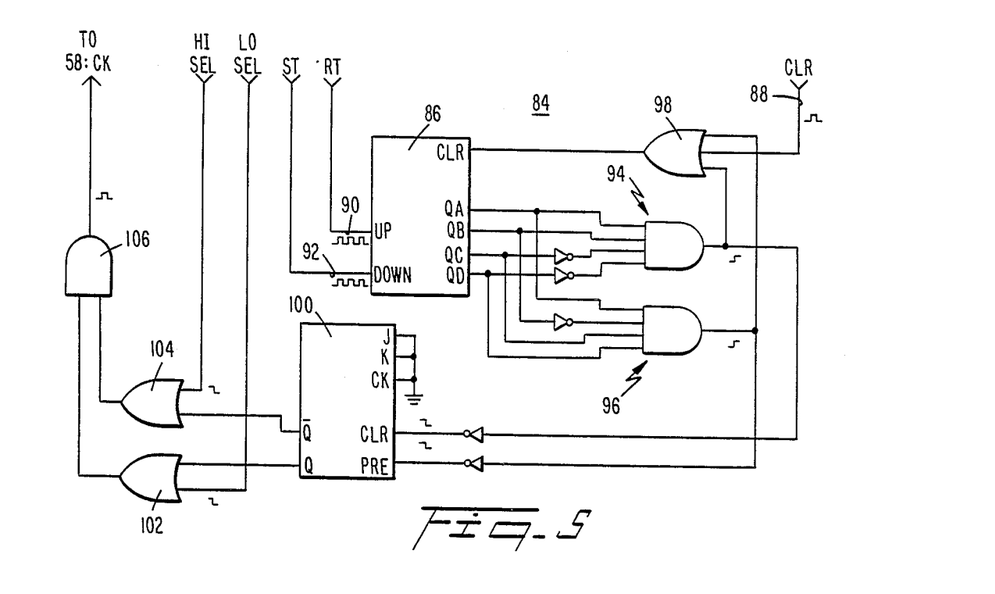
FIG. 5 shows another embodiment of the buffer fill selection circuit of the FIG. 2.

Referring now to FIG. 5, there is shown a modification of the fill level selecting circuit 34. More particularly, there is provided a dynamic buffer fill circuit, shown generally at 84. The illustrated circuit is used to provide automatic control for the buffer fill level, replacing the manually selectable circuit 62. The circuit continuously compares the clock signals ST and RT for frequency differences.

Upon occurrence of a reset condition, the dynamic buffer fill circuit controls a preload fill cycle to an appropriately determined fill level, determined by the magnitude of the frequency difference. The appropriate combination of binary outputs of counter 36 is selected for toggling flip-flop 58 of FIG. 3 in accordance with the magnitude and sign of the frequency difference between the two clock rates.

More particularly, there is provided an up-down counter 86 which is cleared by the master reset signal shown at 88. After such a clearing operation, the RT signal, which is input to up counting terminal 90 of counter 86, increases the count stored in counter 86. Clocking occurs on the rising edge of the RT signal. At the same time, the ST signal is input to the down counting terminal of the counter, shown at 92. Thus, the ST signal clocks down the counter. Upon occurrence of a reset condition the four bit binary counter has an output of 0000. If the RT signal rises before the ST signal then the count increases to 0001. On the other hand, if ST rises before RT then the count decreases from 0000 to 1111.

When the two clock signals have equal frequencies (or very close frequencies), the binary output may fluctuate over the range 1110 to 0010, presenting counts in the range of −2 to +2, for example. The count of counter 86 may stay within this range for an indefinite period. However, when one clock is always faster than the other, the output count of counter 86 eventually exceeds either −2 or +2. Accordingly, there is provided a gating circuit to detect the magnitude of the frequency difference by providing a combination of the outputs of counter 86.

In that regard, there is provided a first combinatorial circuit 94 for determining when the output of counter 86 exceeds 3, i.e., the clock frequency of clock RT exceeds the clock frequency of clock ST. A second combinatorial circuit 96 is used to detect when the magnitude of the frequency difference exceeds 3 in the negative direction, i.e., the frequency of the ST signal exceeds that of the RT signal.

Detection of either condition is used to clear counter 86 via an OR gate 98. Further, the output of the first combinatorial circuit is input to a clear terminal of a flip-flop 100. The output of the second combinatorial circuit is used to set the flip-flop 100. Accordingly, when the clock frequency of the RT signal exceeds that of the ST signal flip-flop 100 is cleared while, when the frequency of the ST signal exceeds that of the RT signal, the flip-flop is set. The output signal shown at 2QC from counter 36, which is to be passed to the flip-flop 58 for a low setting of switching circuits 62, is passed by an OR gate 102 when the Q output of the flip-flop 100 is in a low state (i.e., RT exceeds ST). In a reset condition, an OR gate 104 is provided a high level output from the Q' output of flip-flop 100, thus blocking usage of a high level selection signal to trigger flip-flop 58. The high level selecting signal is obtained from an output of AND gate 82, or the like, as illustrated in FIG. 4.

Thus, when the Q' output of flip-flop 100 is low (i.e., when the frequency of ST exceeds that of RT OR gate 104 passes the high level prefill selection signal and OR gate 102 prevents passage of the low level selection signal to flip-flop 58. The low- and high-level selection output signals of OR gates 102 and 104 are provided through an AND gate 106 to the clock input of flip-flop 58. AND gate 106 simply permits the low level output of either OR gate 102 or OR gate 104 to be passed to the flip-flop The output of AND gate 106 is permitted to toggle only during the buffer fill sequence, i.e., only when the outputs of counter 36 are dynamic.

When either a plus 3 or minus 3 count is reached by counter 36, the outputs of the two combinatorial circuits 94 and 96 reset the counter and permit counting to start over. Since the circuit is constantly counting and resetting, OR gates 102 and 104 dynamically gate or inhibit the high and low select lines. On every reset, the FIFO 20 is allowed to fill until the output of AND gate 106 toggles as determined by the frequencies of the two clock signals RT and ST.

By selecting different combinations of the outputs of counter 36 and separate counter 80 as the signals for triggering flip-flop 58, it is seen that different magnitude of frequency difference between the two clock signals may be used to select different preload fill levels for FIFO 20. Accordingly, the dynamic circuit illustrated in FIG. 5 may be used to provide different preload fill levels as a function of the magnitude of frequency difference between the two clock signals.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. In a multi-segment communication network having at least two segments, each segment having a clock source for generating a data communication rate and data communication equipment (DCE) for communicating with another segment, the improvement comprising:

data terminal equipment means for interfacing between two segments of the communication network;

said terminal equipment means including: first input means for receiving receive clock signals from a first DCE in a first segment;

buffer means for receiving data from the first DCE, second input means for receiving send clock signals from a second DCE in a second segment;

transmitting means for transmitting data from said buffer means to the second DCE responsive to said send clock signals generated by said second DCE; and preload means for loading said buffer means to a predetermined selectable level prior to activating said transmitting means to transmit said data to said second DCE;

said preload means including:

gating means for permitting said send clock signals from the second DCE to activate said buffer means to provide stored data to said transmitting means; and enabling means operable for enabling said gating means to pass said send clock signals from the second DCE to said buffer means only after said buffer means has been filled to a selected level.

2. The data terminal equipment of claim 1, wherein said preload means further comprises counting means for counting a number of bits of received data;

said enabling means being responsive to a predetermined count output of said counting means for enabling said gating means;

whereby said enabling means permits said send clock signals to empty said buffer means only after said predetermined count has been reached and a predetermined number of bits have been clocked in to said buffer means.

3. The data terminal equipment of claim 2, wherein said preload means further comprises switching means responsive to a count established by said counting means for activating said enabling means.

4. The data terminal equipment of claim 3, wherein said enabling means comprises flip flop means clocked by said switching means for providing an output signal to enable said gating means, said output signal from said flip flop means further connected to said counting means to enable said receive clock signals to clock said counting means.

5. The data terminal equipment of claim 3 wherein said switching means comprises manually operable switches for manually selecting a preload level for said buffer means.

6. The data terminal equipment of claim 3 wherein said switching means comprises dynamic fill means responsive to frequency differences between said receive clock signals and said send clock signals for automatically selecting a preload level for said buffer means in accordance with a determination of which of said receive and send clock signals has a higher frequency.

7. The data terminal equipment of claim 6 wherein said dynamic fill means comprises up-down counting means for establishing a sign and magnitude of a frequency difference between said receive and send clock signals and for establishing the preload level based on said sign and magnitude of the frequency difference between said receive and send clock signals.

8. The data terminal equipment of claim 7 further comprising master reset means for generating a master reset signal on power up, manual reset, and alarm reset conditions, wherein said enabling means comprises flip flop means clocked by said switching means for providing an output signal to enable said gating means, said output signal from said flip flop means further connected to said counting means to enable said receive clock signals to clock said counting means, said output signal from said flip flop means being further connected to said master reset means for enabling generation of a master reset in response to an alarm condition.

9. The data terminal equipment of claim 3, further comprising alarm means for generating an alarm signal in response to an underflow or overflow condition of said buffer means.

10. The data terminal equipment of claim 9, further comprising master reset means for generating a master reset signal on power up, manual reset, and alarm reset conditions, wherein said enabling means comprises flip flop means clocked by said switching means for providing an output signal to enable said gating means, said output signal from said flip flop means further connected to said counting means to enable said receive clock signals to clock said counting means, said output signal from said flip flop means being further connected to said master reset means for enabling generation of a master reset in response to said alarm signal.

11. The data terminal equipment of claim 9, further comprising second switching means for switchably controlling said alarm means to generate said alarm signal for one or both of an underflow and an overflow condition, said second switching means being further operable for selecting either one or both of said first and second DCE's to receive, said alarm signal.

12. Data terminal equipment means for interfacing between two segments of a multi-segment communication network, each segment having a clock source for generating a data communication rate and data communication equipment (DCE) for communications with another segment, said data terminal equipment comprising:

first input means for receiving receive clock signals from a first DCE in a first segment;

buffer means for receiving data from the first DCE;

second input means for receiving send clock signals from a second DCE in a second segment;

transmitting means for transmitting data from said buffer means to the second DCE responsive to said send clock signals generated by said second DCE;

preload means for loading said buffer means to a predetermined selectable level prior to activating said transmitting means, said preload means including:

gating means for permitting said send clock signals from the second DCE to activate said buffer means to provide stored data to said transmitting means; and enabling means operable for enabling said gating means to pass said send clock signals from the second DCE to said buffer means only after said buffer means has been filled to a selected level;

alarm means for generating an alarm signal in response to detection of an underflow or overflow condition of said buffer means; and alarm control switching means for switchably controlling said alarm means to generate said alarm signal for one of both of an underflow and an overflow condition, said alarm control switching means being further operable for selecting either one or both of said first and second DCE's to receive said alarm signal.

13. The data terminal equipment of claim 12 wherein said preload means comprises counting means for counting a number of bits of received data;

said enabling means being responsive to a predetermined count output of said counting means for enabling said gating means;

whereby said enabling means permits said send clock signals to empty said buffer means only after said predetermined count has been reached and a predetermined number of bits have been clocked in to said buffer means.

14. The data terminal equipment of claim 13 wherein said preload means comprises count switching means responsive to a count established by said counting means for activating said enabling means, and said count switching means comprises manually operable switches for manually selecting a preload level for said buffer means.

15. The data terminal equipment of claim 13 wherein said preload means comprises count switching means responsive to a count established by said counting means for activating said enabling means, and said count switching means comprises dynamic fill means responsive to frequency differences between said receive clock signals and said send clock signals for automatically selecting a preload level for said buffer means in accordance with a determination of which of said receive and send clock signals has a higher frequency.

16. The data terminal equipment of claim 15 wherein said dynamic fill means comprises up-down counting means for establishing a sign and magnitude of a frequency difference between said receive and send clock signals and for establishing the preload level based on said sign and magnitude of the frequency difference between said receive and send clock signals.

17. The data terminal of claim 16 further comprising master reset means for generating a master reset signal on power up, manual reset, and alarm reset conditions, wherein said enabling means comprises flip flop means clocked by said switching means for providing an output signal to enable said gating means, said output signal from said flip flop means further connected to said counting means to enable said receive clock signals to clock said counting means, said output signal from said flip flop means being further connected to said master reset means for enabling generation of a master reset in response to an alarm condition.

* * * * *